(12) United States Patent
Barras (10) Patent No.: US 7,650,447 B2
(45) Date of Patent: Jan. 19, 2010

(54) SYSTEM AND METHOD FOR A HOST TO ACCESS AN INTERNAL SATA STORAGE DEVICE WITHIN AN ACCESSIBLE HOST USING AN EXTERNAL SERIAL ATA CONNECTION

(75) Inventor: Lawrence S. Barras, Campbell, CA (US)

(73) Assignee: Apple Inc., Cupertino, CA (US)

( * ) Notice: Subject to any disclaimer, the term of this patent is extended or adjusted under 35 U.S.C. 154(b) by 124 days.

(21) Appl. No.: 11/707,286

(22) Filed: Feb. 16, 2007

(65) Prior Publication Data

US 2008/0200071 A1 Aug. 21, 2008

(51) Int. Cl.
*G06F 13/12* (2006.01)
(52) U.S. Cl. .................. 710/74; 710/8; 710/72
(58) Field of Classification Search ........ None
See application file for complete search history.

(56) References Cited

U.S. PATENT DOCUMENTS

| | | | |
|---|---|---|---|
| 7,246,192 B1* | 7/2007 | Chang | 710/311 |
| 7,284,082 B2* | 10/2007 | Greenberger | 710/312 |
| 2006/0187634 A1* | 8/2006 | Tanaka et al. | 361/687 |
| 2007/0022228 A1* | 1/2007 | Hicks et al. | 710/51 |
| 2007/0156328 A1* | 7/2007 | Nakamura | 701/200 |
| 2007/0192513 A1* | 8/2007 | Koo | 710/1 |

* cited by examiner

*Primary Examiner*—Eron J Sorrell
(74) *Attorney, Agent, or Firm*—Kramer Levin Naftalis & Frankel LLP (57) ABSTRACT

An accessible host includes one or more internal SATA storage devices, an external SATA connector, an internal SATA port controller, an external SATA port controller, and a switching mechanism. The switching mechanism allows the accessible host to access an external storage device when the switching mechanism is in a first configuration. When the switching mechanism is in a second configuration, a second host is able to access one or more internal SATA storage devices within the accessible host.

19 Claims, 7 Drawing Sheets

SYSTEM AND METHOD FOR A HOST TO ACCESS AN INTERNAL SATA STORAGE DEVICE WITHIN AN ACCESSIBLE HOST USING AN EXTERNAL SERIAL ATA CONNECTION

BACKGROUND

Storage devices, such as hard disk drives and optical drives, are widely used to provide mass storage for various computing applications. Computers communicate with the storage devices using one of several interfaces. The Universal Serial Bus (USB), Small Computer Systems Interface (SCSI), Institute of Electrical and Electronic Engineers (IEEE) 1394, Serial Advanced Technology Attachment (Serial ATA or SATA), and External Serial Advanced Technology Attachment (eSATA), are examples of such interfaces.

The SATA interface was developed by the Serial ATA International Organization, a consortium of computer and mass storage device manufacturers that defines and adopts specifications for the Serial ATA Interface. The Serial ATA specification is entitled "Serial ATA International Organization: Serial ATA", and is referred to herein as the SATA specification. Revision 2.5 of the SATA specification was publicly released on Oct. 27, 2005.

Figure 1:
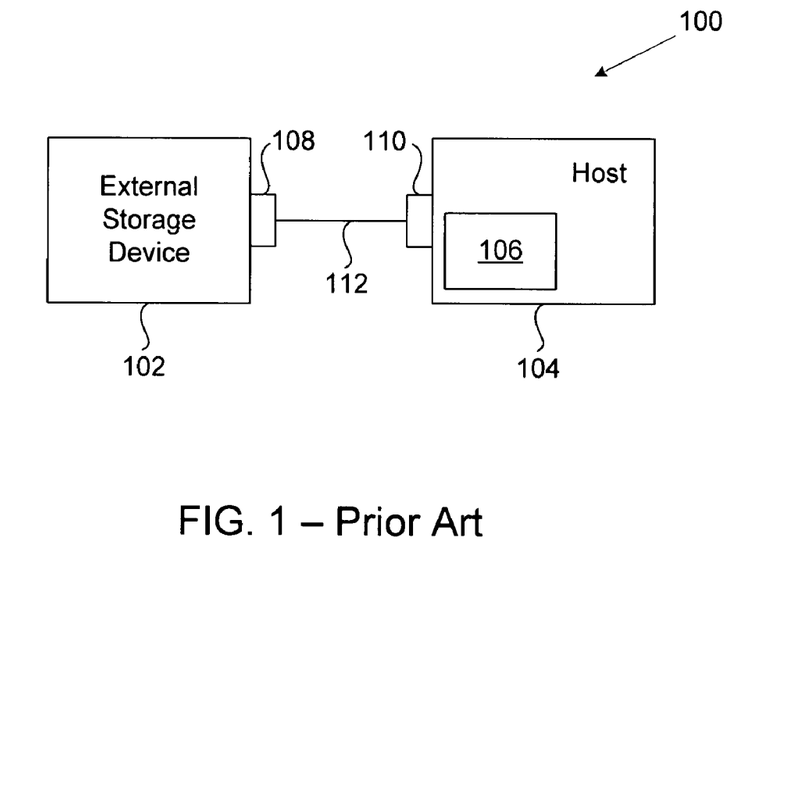
FIG. 1 is a block diagram of an eSATA system according to the prior art.

The eSATA interface is described in the SATA specification as a point-to-point connection between a host (e.g., computer) and a storage device external to the host. FIG. 1 is a block diagram of an eSATA system according to the prior art. System 100 includes external storage device 102, host 104, and internal storage device 106 within host 104. External storage device 102 connects to host 104 using eSATA connectors 108, 110 and eSATA cable 112. Host 104 uses cable 112 to transfer data to and from external storage device 102. The SATA specification, however, does not define a connection that allows another host to access host 104 in order to read data from, or write data to, internal storage device 106.

SUMMARY

In accordance with the invention, a system and method for a host to access an internal SATA storage device within an accessible host using an external serial ATA connection are provided. An accessible host includes one or more internal SATA storage devices, an external SATA connector, an internal SATA port controller, an external SATA port controller, and a switching mechanism. The switching mechanism allows the accessible host to access an external storage device when the switching mechanism is in a first configuration. When the switching mechanism is in a second configuration, a host is able to access one or more internal SATA storage devices within the accessible host.

When the accessible host includes one internal SATA storage device, the external SATA connector is implemented as an external single lane SATA connector in an embodiment in accordance with the invention. When the accessible host includes two or more internal SATA storage devices, the external SATA connector may be implemented as an external single lane SATA connector or as a multi-lane SATA connector. In one embodiment in accordance with the invention, a port selector is connected to each internal SATA storage device and a port multiplier is connected between the port selectors and the switching mechanism when the external SATA connector is an external single lane SATA connector. When the external SATA connector is an external multi-lane connector, a port selector is connected between a respective internal SATA storage device and the switching mechanism in another embodiment in accordance with the invention.

DETAILED DESCRIPTION

The following description is presented to enable embodiments of the invention to be made and used, and is provided in the context of a patent application and its requirements. Various modifications to the disclosed embodiments will be readily apparent, and the generic principles herein may be applied to other embodiments. Thus, the invention is not intended to be limited to the embodiments shown but is to be accorded the widest scope consistent with the appended claims. Like reference numerals designate corresponding parts throughout the figures.

Figure 2:
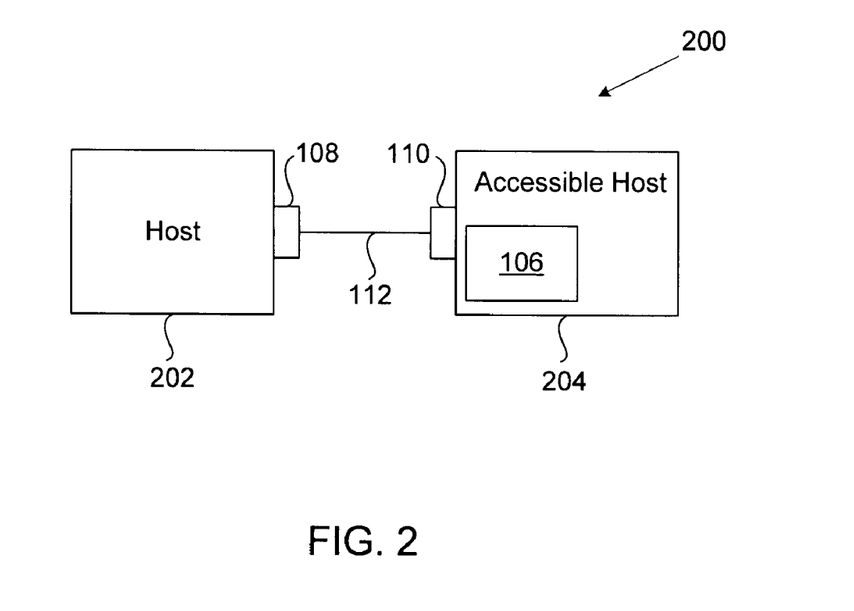
FIG. 2 is a block diagram of an eSATA system in an embodiment in accordance with the invention.

FIG. 2 is a block diagram of an eSATA system in an embodiment in accordance with the invention. System 200 includes host 202, accessible host 204, external SATA connectors 108, 110, and external SATA cable 112. Hosts 202, 204 are each implemented as any apparatus operable to perform the host functions as defined in the SATA specification. Examples of a host include, but are not limited to, a computer, a video camcorder, a digital video recorder, and a digital audio player. As will be described in conjunction with FIGS. 3A-8, accessible host 204 can be placed in a device mode and act as an external storage device, thereby allowing host 202 to read data from, or write data to, internal storage device 106 within accessible host 204 using external SATA cable 112.

Figure 3A:
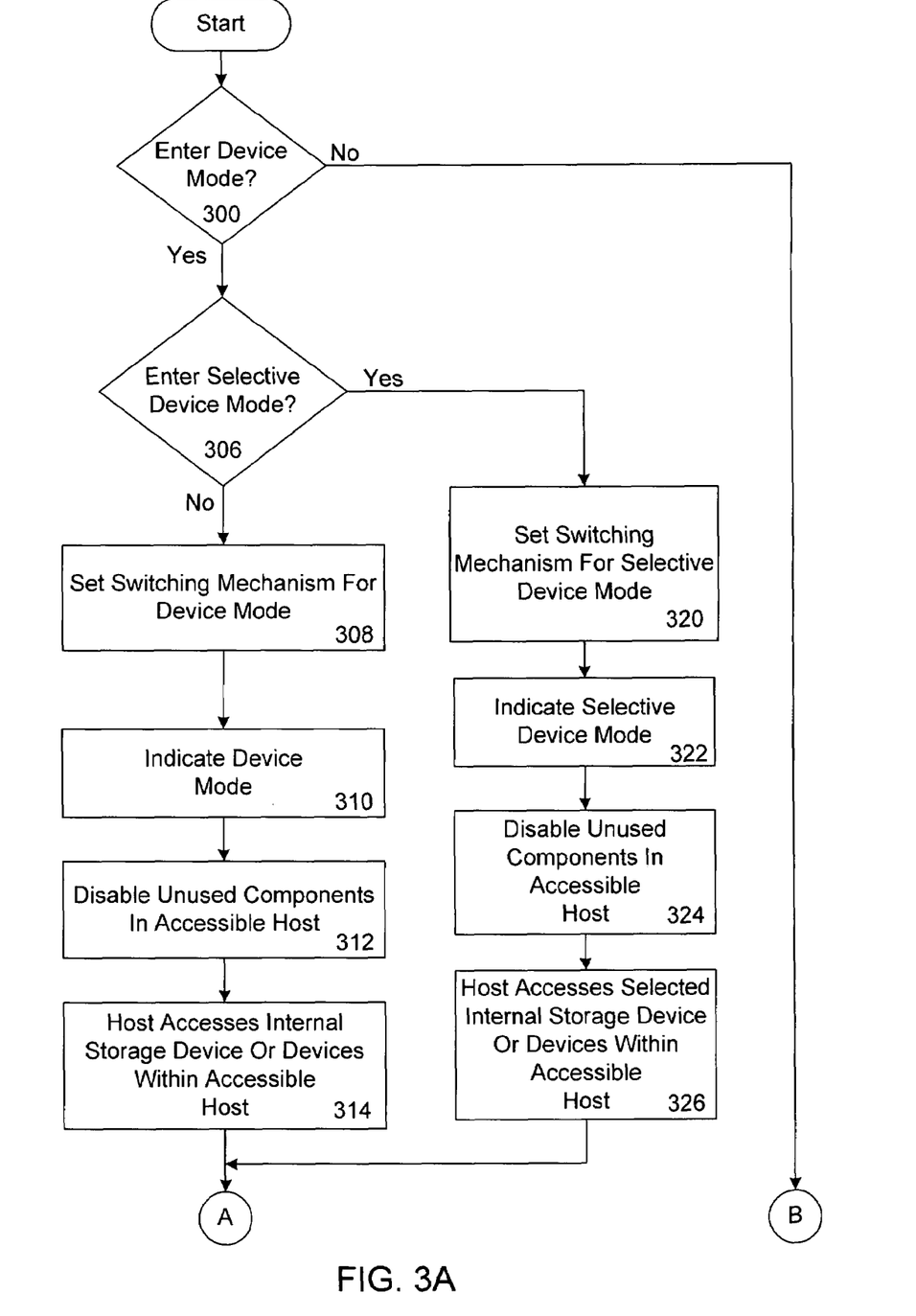
FIGS. 3A-3B depict a flowchart of a method for a host to access an internal SATA storage device within an accessible host in an embodiment in accordance with the invention.
Figure 3B:
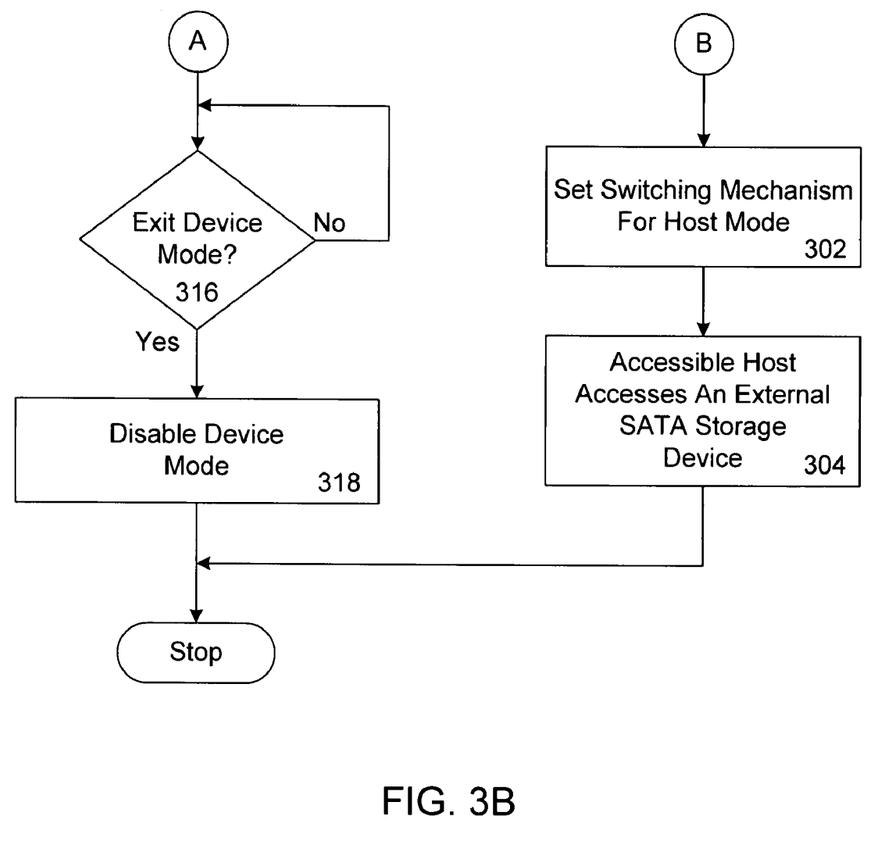

Referring now to FIGS. 3A-3B, there is shown a flowchart of a method for a host to access an internal SATA storage device within an accessible host in an embodiment in accordance with the invention. Initially a determination is made at block 300 as to whether the accessible host is to enter a device mode. The device mode is a mode where the accessible host acts as an external SATA device. When the accessible host is in the device mode, another host is able to access one or more internal SATA storage devices within the accessible host and read data from, or write data to, the internal SATA storage device within the accessible host.

The accessible host can enter the device mode using one of a variety of techniques. For example, a user can hold down a specific key on the keyboard when the accessible host is initially powered up to enter the device mode in an embodiment in accordance with the invention. In another embodiment in accordance with the invention, the user can throw a mechanical switch to have the accessible host enter the device mode. And in yet another embodiment in accordance with the invention, the user can select the device mode using a user interface (see FIG. 8).

If the accessible host will not enter the device mode, the method passes to block 302 where one or more switching mechanisms are set for the host mode. The host mode is a mode where the accessible host acts as a host and can access an external SATA storage device. The one or more switching mechanisms are described in more detail in conjunction with FIGS. 4-7.

Once the switching mechanism is set for the host mode, the accessible host accesses an external SATA storage device connected to the accessible host (block 304). By accessing the external storage device, the accessible host is able to read data from, or write data to, the external SATA storage device. Referring again to block 300, if the accessible host will enter the device mode, the method passes to block 306 where a determination is made as to whether the accessible host is to enter a selective device mode. The selective device mode is a mode where the accessible host acts as an external SATA device and a second host accesses only selected internal SATA storage devices within the accessible host. For example, if an accessible host has four internal SATA storage devices, a second host may access only one of the internal SATA storage devices in the selective device mode.

If the accessible host will not enter the selective device mode, the method passes to block 308 where the one or more switching mechanisms are set for the device mode. The accessible host then indicates it has entered the device mode, as shown in block 310. The accessible host can display an icon on an attached display to indicate it is in the device mode in an embodiment in accordance with the invention. In other embodiments in accordance with the invention, the accessible host can indicate it is in the device mode in other ways. For example, an audible or visual annunciator can be used to indicate the device mode.

The unused components within the accessible host are then turned off or placed in a reduced power state, as shown in block 312. Examples of such components include, but are not limited to, the host processor, controllers, and the display electronics when an active display is not required. The only components in the accessible host that use power are the one or more internal SATA storage devices, the cooling system used by the internal storage device or devices, and the switching mechanism in an embodiment in accordance with the invention.

The second host then accesses the one or more internal SATA storage devices within the accessible host (block 314). The second host can write data to, or read data from the internal SATA storage device within the accessible host. A determination is then made at block 316 as to whether the accessible host is to exit the device mode. If so, the device mode is deactivated at block 318 when the second host no longer needs access to the internal SATA storage device or devices within the accessible host. Restarting the accessible host is one technique for deactivating the device mode in an embodiment in accordance with the invention. Other embodiments in accordance with the invention can deactivate the device mode using different techniques.

Returning again to block 306, if the accessible host will enter the selective device mode, the method passes to block 320 where the one or more switching mechanisms are set for the selective device mode. The accessible host then indicates it has entered the selective device mode (block 322) and the unused components within the accessible host are turned off or placed in a reduced power state (block 324).

The second host then accesses the selected one or more internal SATA storage devices within the accessible host, as shown in block 326. The second host can write data to, or read data from the selected internal SATA storage device or devices within the accessible host. A determination is then made at block 316 as to whether the accessible host is to exit the device mode If so, the device mode is deactivated at block 318 when the second host no longer needs access to the selected internal SATA storage device or devices within the accessible host.

The selected one or more internal storage devices can be identified at block 306 or block 320 using one of several techniques. For example, a user can hold down one key on the keyboard to enter the device mode and then hold down a number key or enter a drive identifier to specify which internal SATA storage device or devices are to be accessed in an embodiment in accordance with the invention. Alternatively, a user can specify the selected one or more internal SATA storage devices using a user interface in another embodiment in accordance with the invention (see FIG. 8).

Embodiments in accordance with the invention are not limited to the blocks and the organization of the blocks shown in FIGS. 3A-3B. Other embodiments in accordance with the invention can include additional blocks, reorder the blocks, or delete some of the blocks shown in FIGS. 3A-3B. By way of example only, blocks 310 and 322 may not be included in another embodiment in accordance with the invention. Alternatively, blocks 312 and 324 may not be implemented in other embodiments in accordance with the invention. And finally, block 306 and blocks 320-326 may not be included when an accessible host does not have a selective device mode.

Figure 4:
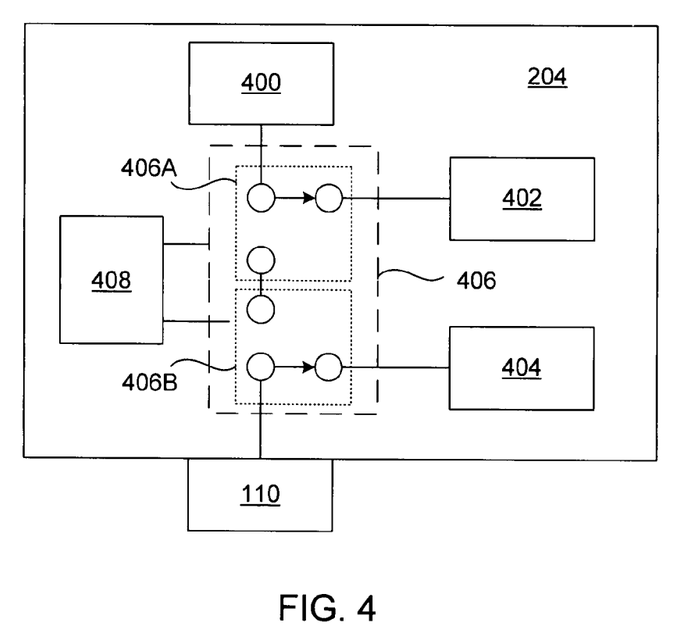
FIG. 4 is a functional diagram of a first accessible host that is used to illustrate block 302 shown in FIG. 3B in an embodiment in accordance with the invention.

FIG. 4 is a functional diagram of a first accessible host that is used to illustrate block 302 shown in FIG. 3B in an embodiment in accordance with the invention. Accessible host 204 includes internal SATA storage device 400, internal SATA port controller 402, external SATA port controller 404, and switching mechanism 406.

Switching mechanism 406 includes two electronic switches 406A, 406B in an embodiment in accordance with the invention. Mode selector 408 sets switches 406A, 406B such that host 204 enters either the host mode or the device mode in the embodiments shown in FIG. 4 and FIG. 5. Mode selector 408 is implemented as a processor running firmware designed to determine the proper mode and set the switching mechanisms accordingly in an embodiment in accordance with the invention.

The settings for switches 406A, 406B for the host mode are shown in FIG. 4. Switch 406A connects internal SATA storage device 400 to internal SATA port controller 402 while switch 406B connects external SATA port controller 404 to external SATA connector 110. Internal and external SATA port controllers 402, 404 are conventional SATA controllers in an embodiment in accordance with the invention. As discussed earlier, accessible host 204 is able to access an external SATA storage device (not shown) that is connected to accessible host 204 when accessible host 204 is in the host mode.

Figure 5:
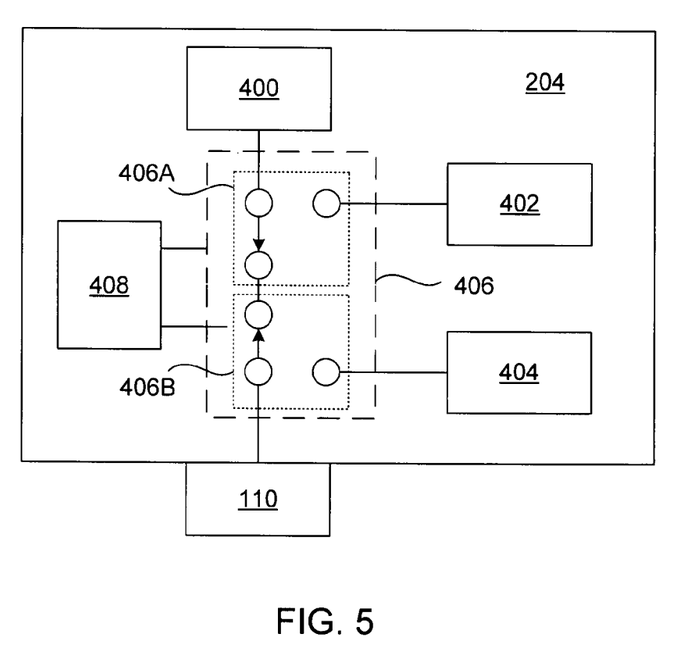
FIG. 5 is a functional diagram of the first accessible host that is used to illustrate block 308 shown in FIG. 3A in an embodiment in accordance with the invention.

Referring now to FIG. 5, there is shown a functional diagram of the accessible host that is used to illustrate block 308 shown in FIG. 3A in an embodiment in accordance with the invention. As discussed earlier, a second host (not shown) is able to access internal SATA storage device 400 when accessible host 204 is in the device mode. Switches 406A, 406B are set such that internal SATA storage device 400 is connected to eSATA connector 110. Accessible host 204 is able to act as an external SATA storage device in the device mode because internal SATA port controller 402 and external SATA port controller 404 are disconnected and operationally isolated.

External SATA connector 110 is implemented as an external single lane SATA connector in the embodiments shown in FIGS. 4 and 5. A single lane SATA connector is described in the SATA specification as a connector that provides a single communication path or connection between a host and an external device. In the embodiments shown in FIGS. 4 and 5, eSATA connector 110 provides a single communication path between a second host (not shown) and internal SATA storage device 400.

Figure 6:
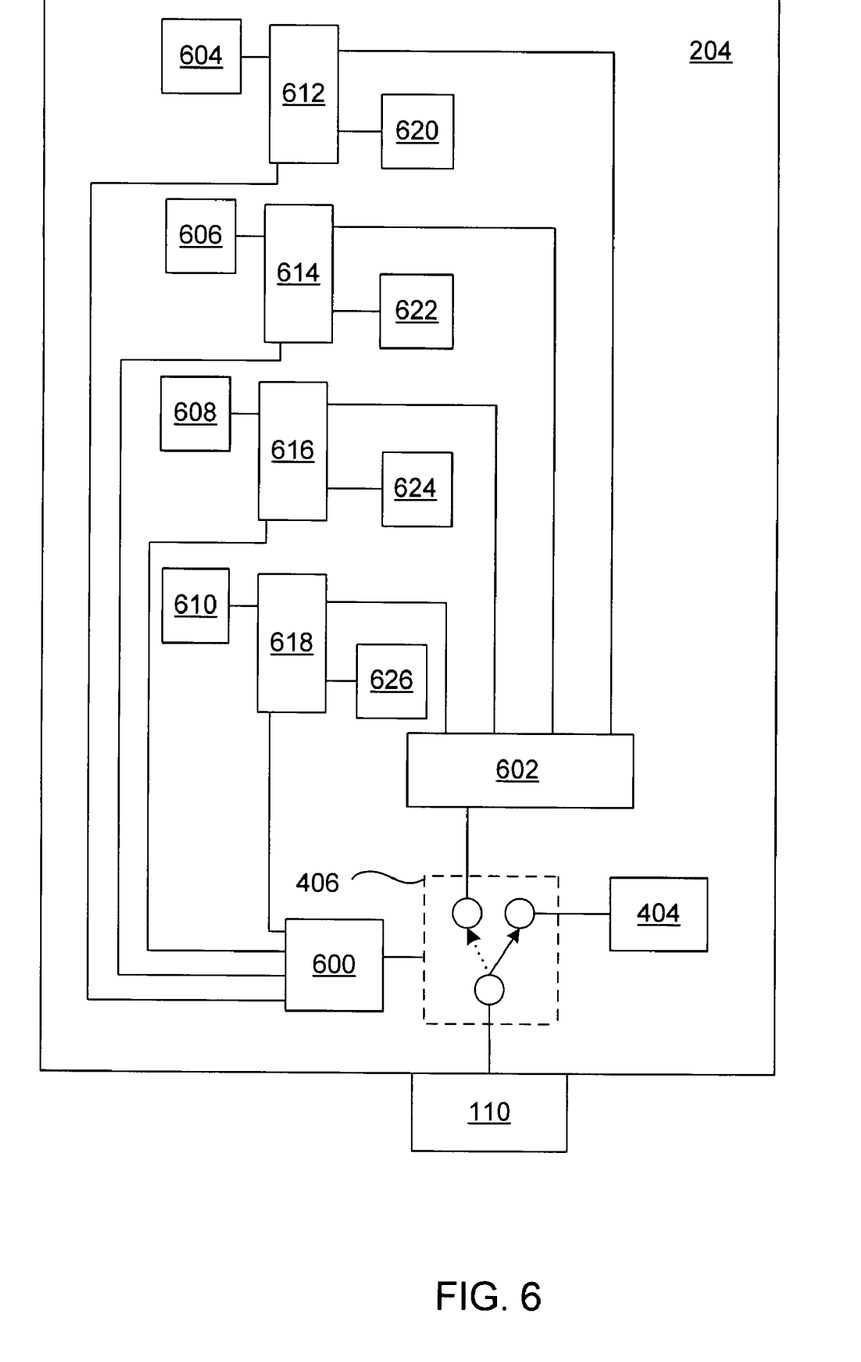
FIG. 6 is a functional diagram of a second accessible host that is used to illustrate blocks 302, 308, 320 shown in FIGS. 3A-3B in an embodiment in accordance with the invention.

FIG. 6 is a functional diagram of a second accessible host that is used to illustrate blocks 302, 308, 320 shown in FIGS. 3A-3B in an embodiment in accordance with the invention. Accessible host 204 includes mode selector 600, switching mechanism 406, and external SATA port controller 404. Switching mechanism 406 is set as shown with the solid arrow when accessible host 204 is in the host mode.

Switching mechanism 406 is set as shown with the dotted arrow when accessible host 204 is in the device mode. External SATA connecter 110 is connected to port multiplier 602 when host 204 is in the device mode. External SATA connector 110 is implemented as a single lane eSATA connector in the embodiment shown in FIG. 6.

A port multiplier is defined in the SATA specification as a mechanism for a single host connection to communicate with multiple external devices. In the embodiment shown in FIG. 6, port multiplier 602 allows a second host (not shown) connected to accessible host 204 to communicate with multiple internal SATA storage devices 604, 606, 608, 610.

Port selectors 612, 614, 616, 618 connect port multiplier 602 to internal SATA storage devices 604, 606, 608, 610, respectively. The SATA specification defines a port selector as a device that allows two different host ports or controllers to connect to the same device. In the embodiment shown in FIG. 6, each port selector 612, 614, 616, 618 allows a respective internal SATA storage device 604, 606, 608, 610 to either connect to a respective internal SATA port controller 620, 622, 624, 626 or to port multiplier 602. The setting of switching mechanism 406 determines whether the internal SATA storage devices 604, 606, 608, 610 are connected to a respective internal SATA port controller 620, 622, 624, 626 or to port multiplier 602.

A second host (not shown) that is connected to accessible host 204 can access all internal SATA storage devices 604, 606, 608, 610 or selectively access one or more of the internal SATA storage devices 604, 606, 608, 610. Mode selector 600 receives the signal or signals to enter the device mode. Mode selector 600 also receives, if necessary, one or more additional signals identifying which internal SATA storage devices 604, 606, 608, 610 will be accessed for the selective host-device mode. Mode selector 600 then transmits a signal to each port selector 612, 614, 616, 618 or to each affected port selector 612, 614, 616, 618 to cause the port selector or selectors 612, 614, 616, 618 to activate the appropriate communication path to its respective storage device 604, 606, 608, 610.

Figure 7:
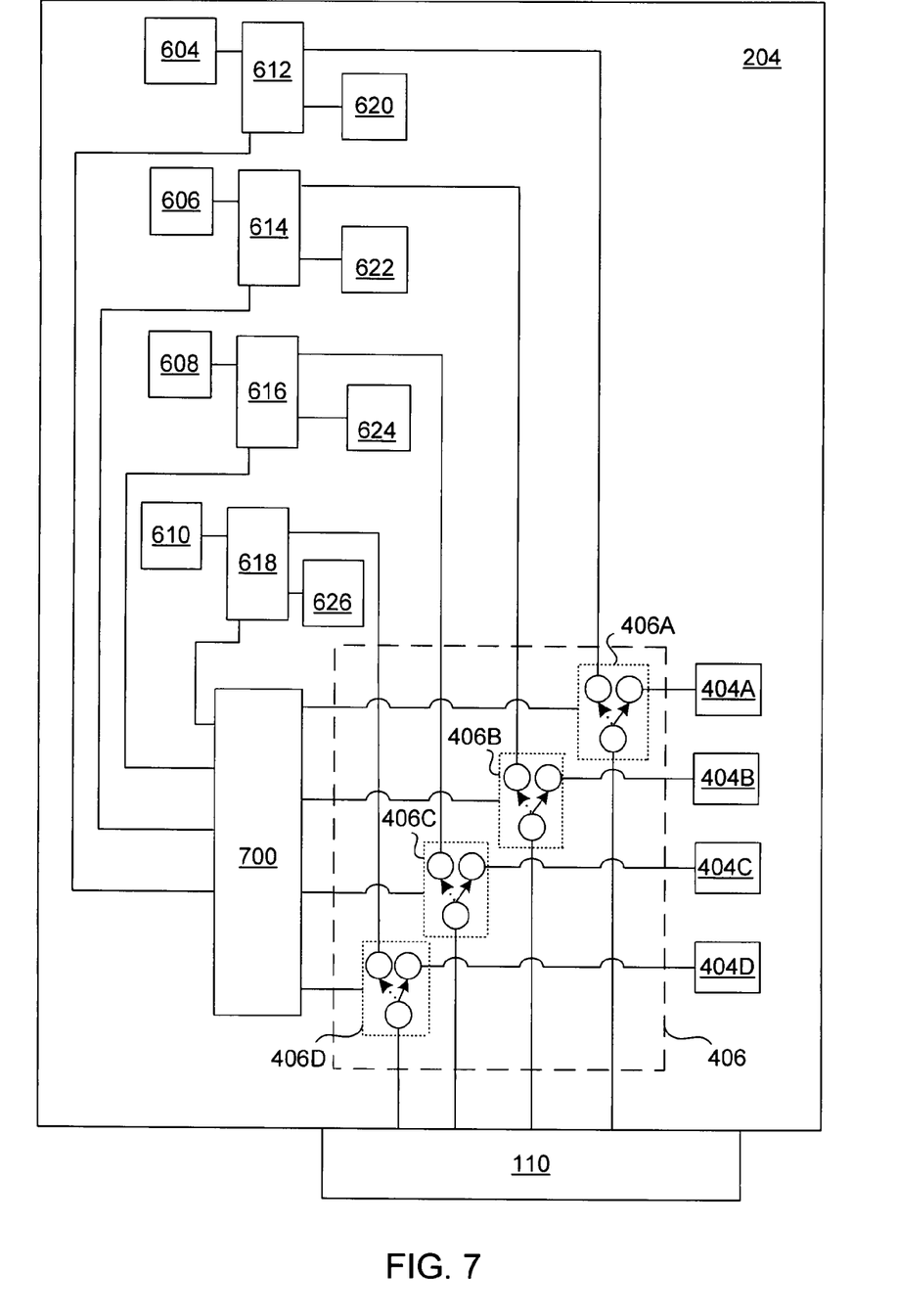
FIG. 7 is a functional diagram of a third accessible host that is used to illustrate blocks 302, 308, 320 shown in FIGS. 3A-3B in an embodiment in accordance with the invention.

Referring now to FIG. 7, there is shown a functional diagram of a third exemplary accessible host that is used to illustrate blocks 302, 308, 320 shown in FIG. 3A-3B in an embodiment in accordance with the invention. Accessible host 204 includes mode selector 700, switching mechanism 406, and external SATA port controller 404. Switching mechanism 406 includes four switches 406A, 406B, 406C, 406D and external SATA port controller 404 includes four external SATA port controllers 404A, 404B, 404C, 404D in the embodiment shown in FIG. 7.

Switches 406A-D are set as shown with the solid arrows when accessible host 204 enters the host mode. Switches 406A, 406B, 406C, 406D are set as shown with the dotted arrows when accessible host 204 enters the device mode. Switches 406A-D may be set as a group for device mode or selective device mode or set individually for the selective device mode in an embodiment in accordance with the invention.

External SATA connector 110 is implemented as an external multi-lane SATA connector in the embodiment shown in FIG. 7. External SATA connecter 110 is connected to internal SATA storage devices 604, 606, 608, 610 via port selectors 612, 614, 616, 618, respectively, when accessible host 204 is in the device mode. External SATA connecter 110 is connected to some of the internal SATA storage devices 604, 606, 608, 610 when accessible host 204 is in the selective device mode.

Mode selector 700 receives the signal or signals to enter the host-device mode. Mode selector 700 also receives, if necessary, one or more additional signals identifying which internal SATA storage devices 604, 606, 608, 610 will be accessed for the selective host-device mode. Mode selector 700 then transmits a signal to each port selector 612, 614, 616, 618 or to each affected port selector 612, 614, 616, 618 to cause the port selector or selectors 612, 614, 616, 618 to activate the appropriate communication path to its respective storage device 604, 606, 608, 610.

The embodiments shown in FIGS. 6 and 7 depict four internal SATA storage devices. Embodiments in accordance with the invention, however, are not constrained to this implementation. Any number of internal SATA storage devices may be included in an accessible host. For example, Revision 2.5 of the SATA specification currently supports up to sixteen internal SATA storage devices in the embodiment shown in FIG. 6. The embodiment shown in FIG. 7 can use four groups of sixteen internal SATA storage devices because the multi-lane SATA connector 110 provides four separate communication paths.

Although switching mechanism 406 is shown as including electronic switches in the embodiments shown in FIGS. 4-7, other embodiments in accordance with the invention are not limited to this implementation. Switching mechanisms may be implemented as any mechanism that switches between communication paths. For example, switching mechanism 406 may be implemented as one or more mechanical switches, voltage controlled amplifiers, and multiplexers.

Figure 8:
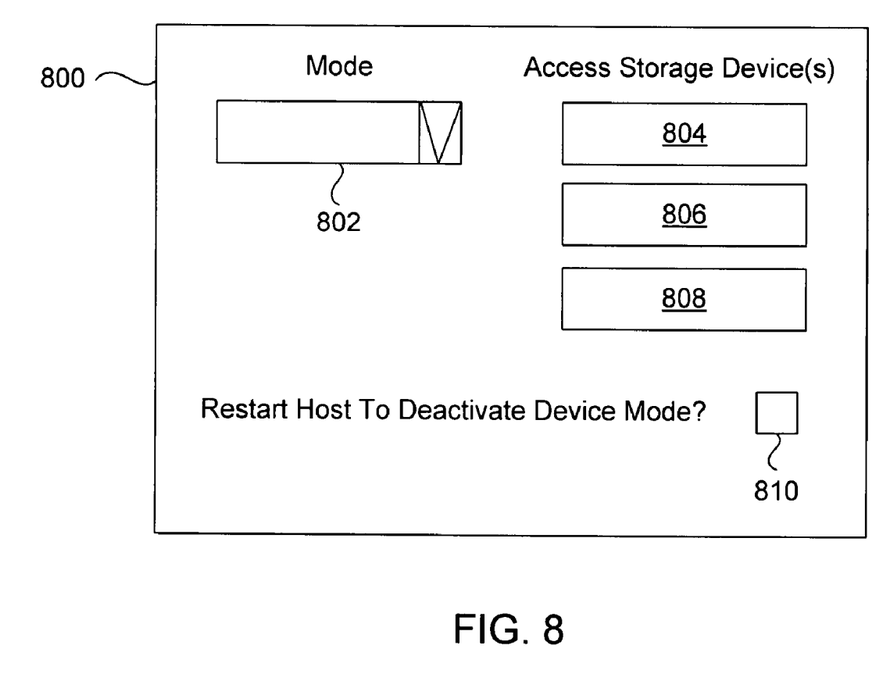
FIG. 8 is a graphical illustration of a user interface that can be used to implement blocks 300 and 306 shown in FIG. 3A in an embodiment in accordance with the invention.

FIG. 8 is a graphical illustration of a user interface that can be used to implement blocks 300 and 306 shown in FIG. 3A in an embodiment in accordance with the invention. User interface 800 includes pull down menu 802, dialog boxes 804, 806, 808, and checkbox 810. Pull-down menu 802 is used to select the mode in an embodiment in accordance with the invention. A user can select either the host mode, the device mode, or the selective device mode in an embodiment in accordance with the invention.

Dialog boxes 804, 806, 808 are used to enter numbers or words that identify which internal SATA storage devices are to be accessed while the accessible host is in the selective device mode. Any number of dialog boxes can be used in other embodiments in accordance with the invention.

And finally, checkbox 810 is used to instruct the accessible host to restart to deactivate the device mode in an embodiment in accordance with the invention. Other embodiments in accordance with the invention may configure user interface 800 differently. For example, a dialog box or checkboxes can be used in place of pull-down menu 802. Alternatively, additional features can be included in user interface 800.

The invention claimed is:

1. An accessible host comprising a plurality of internal SATA storage devices and an external SATA connector, the host comprising:
   a plurality of internal SATA port controllers;
   an external SATA port controller;
   a switching mechanism connected to the external SATA connector and operable to connect the external SATA connector to the external SATA port controller and connect at least one of the plurality of internal SATA port controllers to at least one of the plurality of internal SATA storage devices when the switching mechanism is in a first configuration,
   operable to connect the external SATA connector to the plurality of internal SATA storage devices when the switching mechanism is in a second configuration, and
   operable to connect the external SATA connector to a selected one of the plurality of internal SATA storage devices when the switching mechanism is in a third configuration.

2. The accessible host of claim 1, wherein the external SATA connector comprises an external single lane SATA connector.

3. The accessible host of claim 1, further comprising:
   a plurality of port selectors each connected to a respective internal SATA storage device; and
   a port multiplier connected between the plurality of port selectors and the switching mechanism.

4. The accessible host of claim 3, wherein each one of the plurality of internal SATA port controllers is connected to a respective SATA storage device.

5. The accessible host of claim 4, further comprising a mode selector connected to the switching mechanism and to each port selector.

6. The accessible host of claim 3, further comprising a mode selector connected to the switching mechanism and to each port selector, wherein the mode selector is operable to activate a communication path between the selected one of the plurality of internal SATA storage devices and the respective port selector connected to the selected one of the plurality of internal SATA storage devices.

7. The accessible host of claim 1, wherein the external SATA connector comprises an external multi-lane SATA connector.

8. The accessible host of claim 7, further comprising a plurality of port selectors each connected to a respective SATA storage device and to the switching mechanism.

9. The accessible host of claim 8, wherein each one of the plurality of internal SATA port controllers is connected to a respective SATA storage device and a respective port selector.

10. The accessible host of claim 7, wherein the external SATA port controller comprises one of a plurality of external SATA port controllers.

11. The accessible host of claim 10, wherein the switching mechanism is operable to connect the external SATA connector to the plurality of external SATA port controllers when the switching mechanism is in the first configuration.

12. The accessible host of claim 1, further comprising a plurality of port selectors each connected to a respective internal SATA port controller and between a respective internal SATA storage device and the switching mechanism.

13. The accessible host of claim 12, further comprising a mode selector connected to the switching mechanism and to each port selector.

14. An external serial ATA system, comprising:
   an accessible host comprising a plurality of internal SATA storage devices within the accessible host and at least one external SATA port controller;
   a second host connected to the accessible host using an external SATA connection; and
   a switching mechanism operable to allow the second host to access:
   at least one of the at least one external SATA port controller within the accessible host when the switching mechanism is in a host mode configuration;
   the plurality of internal SATA storage devices within the accessible host when the switching mechanism is in a device mode configuration; and
   at least one selected internal SATA storage device of the plurality of internal SATA storage devices within the accessible host when the switching mechanism is in a selective device mode configuration.

15. The system of claim 14, further comprising a port multiplier connected between the switching mechanism and a plurality of port selectors, wherein each port selector is connected to a respective internal SATA storage device.

16. The system of claim 14, further comprising a plurality of port selectors each connected between the switching mechanism and a respective internal SATA storage device.

17. A method for a second host to access a plurality of internal SATA storage devices within an accessible host using an external serial ATA connection, the method comprising:
   determining whether to enter a host mode or a device mode or a selective device mode;
   setting a switching mechanism to a first configuration when entering the host mode;
   setting a switching mechanism to a second configuration when entering the device mode, wherein the device mode allows the second host to access the plurality of internal SATA storage devices within the accessible host; and
   setting the switching mechanism to a third configuration when entering the selective device mode, wherein the selective device mode allows the second host to access a selected internal SATA storage device within the accessible host.

18. The method of claim 17, further comprising disabling unused components after entering the device mode.

19. The method of claim 17, further comprising indicating the device mode.

* * * * *

UNITED STATES PATENT AND TRADEMARK OFFICE
CERTIFICATE OF CORRECTION

PATENT NO. : 7,650,447 B2  Page 1 of 1
APPLICATION NO. : 11/707286
DATED : January 19, 2010
INVENTOR(S) : Lawrence S. Barras It is certified that error appears in the above-identified patent and that said Letters Patent is hereby corrected as shown below:

In column 4, line 11, delete "mode" and insert -- mode. --, therefor.

In column 5, line 62, delete "FIG." and insert -- FIGS. --, therefor.

Signed and Sealed this

Twenty-first Day of September, 2010

David J. Kappos
*Director of the United States Patent and Trademark Office*